US009026454B2

(12) United States Patent
Hinrichs et al.

(10) Patent No.: US 9,026,454 B2
(45) Date of Patent: May 5, 2015

(54) SYSTEM FOR PROCURING SERVICES

(75) Inventors: Andreas Hinrichs, Diekholzen (DE);
Florian Wildschuette, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 2316 days.

(21) Appl. No.: 10/572,693

(22) PCT Filed: Aug. 31, 2004

(86) PCT No.: PCT/EP2004/051973
§ 371 (c)(1),
(2), (4) Date: Feb. 21, 2007

(87) PCT Pub. No.: WO2005/029376
PCT Pub. Date: Mar. 31, 2005

(65) Prior Publication Data
US 2007/0198276 A1    Aug. 23, 2007

(30) Foreign Application Priority Data
Sep. 19, 2003  (DE) .................. 103 43 486

(51) Int. Cl.
*G06Q 10/00* (2012.01)
*G06Q 30/06* (2012.01)
*G06Q 10/02* (2012.01)
*G08G 1/00* (2006.01)

(52) U.S. Cl.
CPC .............. *G06Q 30/06* (2013.01); *G06Q 10/02* (2013.01); *G08G 1/202* (2013.01)

(58) Field of Classification Search
USPC ............................................. 705/5; 340/988
See application file for complete search history.

(56) References Cited

U.S. PATENT DOCUMENTS

| 5,799,263 | A | * | 8/1998 | Culbertson | .................... 701/117 |
| 5,948,040 | A | * | 9/1999 | DeLorme et al. | ............. 701/426 |
| 2002/0186144 | A1 | * | 12/2002 | Meunier | .................. 340/825.28 |
| 2003/0034873 | A1 | * | 2/2003 | Chase et al. | ................... 340/5.2 |

FOREIGN PATENT DOCUMENTS

| DE | 196 32 296 | 2/1998 |
| DE | 199 28 451 | 1/2001 |
| EP | 1 298 623 | 4/2003 |
| EP | 1 302 783 | 4/2003 |
| EP | 1 335 288 | 8/2003 |
| JP | 2002 149527 | 5/2002 |
| WO | 02 06994 | 1/2002 |

* cited by examiner

*Primary Examiner* — Tsan-Yu J Huang
(74) *Attorney, Agent, or Firm* — Kenyon & Kenyon LLP

(57) ABSTRACT

A system for procuring services such as, in particular, ride-share opportunities and transportation services, has at least one stationary server and a multitude of subscribers including suppliers and interested parties. The system includes a communications arrangement which enable at least an information exchange between the stationary server and the subscribers. The system further includes a positioning arrangement for determining the current position of the subscribers, and a memory arrangement for at least temporary storage of data and positions of the subscribers.

17 Claims, 4 Drawing Sheets

| Supplier | Hanover | Hildesheim | Offer | Details |
|---|---|---|---|---|
| 11.1 | 11:30 | 12:30 | 3 passengers | xxxx |
| 11.2 | 09:15 | 10:00 | 1 passenger having a drivers license | xxxx |

SYSTEM FOR PROCURING SERVICES

FIELD OF THE INVENTION

The present invention relates to a method for procuring services.

BACKGROUND INFORMATION

German Published Patent Application No. 196 32 296 describes a method and a device for procuring rideshare opportunities in a telecommunication network. In this known method for procuring rideshare opportunities, a subscriber looking for rideshare opportunities accesses a server through a telecommunication network to download and select from the rideshare opportunities stored therein. The server includes an interface circuit, which connects it to a procurement center and which receives a call from the interested subscriber, and a data memory which stores data records containing data on the rideshare opportunities offered, each being assigned to one of the offering subscribers. Furthermore, the server contains a processor which controls voice input of input data which is input by the interested subscriber and the data about the desired rideshare opportunity, and compares the input data with the data records and controls a voice output of those data records which match the input data.

Furthermore, rideshare centers are known in population centers or in an Internet structure. In these centers a supplier informs several days or even weeks ahead of the scheduled travel date that he/she intends to travel on a certain date from point X to point Y and is willing to take on passengers. This information is collected by the above-mentioned rideshare center or Internet organization and kept available for potential interested parties. Interested parties inquiring about rideshare opportunities with the rideshare center receive, against payment, information about existing rideshare offers and may contact the supplier directly.

Procurement of rideshare opportunities via the SMS service is also known. In this system, an inquiry is sent to a rideshare center via SMS. The inquiry includes at least information about the point of departure, the destination, and the desired date and time of departure. The rideshare center determines a suitable supplier and sends the supplier's telephone number back to the interested party. The interested party and the supplier may then further discuss the details of the ride.

SUMMARY OF THE INVENTION

The object of the present invention is to advantageously refine rideshare systems, providing them with increased flexibility in particular. Compared with the known systems it is therefore possible to better utilize potentially available rideshare resources and not only to preserve, but even enhance mobility despite increasing traffic densities, without providing additional vehicles. The present invention also takes advantage of the fact documented by numerous traffic analyses that many drivers travel with only partially loaded vehicles and are willing to share rides. In view of the constantly increasing fuel costs and lack of parking spaces in population centers, this may be a particularly attractive offer for many travelers. One essential point of the present invention is the timely linkage of position and/or route information of rideshare opportunity suppliers and position and/or route information of individuals interested in those rideshare opportunities. In contrast with conventional procurement offerings of rideshare opportunities which typically only coordinate departure and destination points, the present invention allows route information of the supplier and the interested party to be linked. This means that coordination not only between starting and destination points, but also of all points or possible stops along a route is made possible. It may be particularly advantageous to combine appropriate partial route segments of various suppliers into an intended route of an interested party. It is particularly advantageous if information is also exchanged between an on-board navigation system and at least one, preferably stationary, server. Thus, for example, the route information of a supplier is communicated to the server when starting the trip. The supplier may then inform the system that he/she is flexible regarding the route selection and define a travel corridor of predefinable width along the given route. The same holds true for defining the start and destination points. If a higher degree of flexibility is possible, the supplier may also define a start area and/or destination area by specifying a radius around the starting point or destination point that is convenient to the supplier. Finally, the supplier may provide a time window for the departure and/or arrival instead of exact start and arrival times. An interested party may also take a flexible attitude to increase the probability of a match. The position information of interested parties stored in the server is communicated to the on-board navigation system as an intermediate destination to arrive at. To facilitate picking up a ride without wasting time, the imminent arrival of the supplier to the intermediate destination and pick-up point is advantageously communicated to the interested party. This may take place by appropriately communicating time information, distance information, or a combination of these pieces of information. Rideshare opportunities may be searched almost spontaneously and in real time and do not have to be scheduled days or even weeks ahead. This greatly enhances the flexibility of such systems and results in increased acceptance by potential users. The approach according to the present invention therefore also makes rideshare opportunities possible for short rides, for example, in an urban area. By virtually continuous updates of the supplier's and the interested party's position information, the reliability of contact at the pick-up site of the interested party is increased. The approach according to the present invention is also of great interest for transportation of goods, since empty runs may be largely avoided. Tie-in into existing traffic networks is particularly advantageous, because mobility may then be ensured even if no rideshare opportunity exists on a portion of the route.

DETAILED DESCRIPTION

Certain terms are used in the description that follows, which are briefly elucidated below. A supplier, as defined in the present invention, is an individual who offers a service such as a rideshare opportunity or transportation possibility to transport people and/or goods. The supplier may be a private individual or a business. An interested party is understood to be an individual looking for a transportation option for him/herself and/or other individuals or goods. A rideshare opportunity is understood as the possibility of transporting people or goods.

Figure 1:
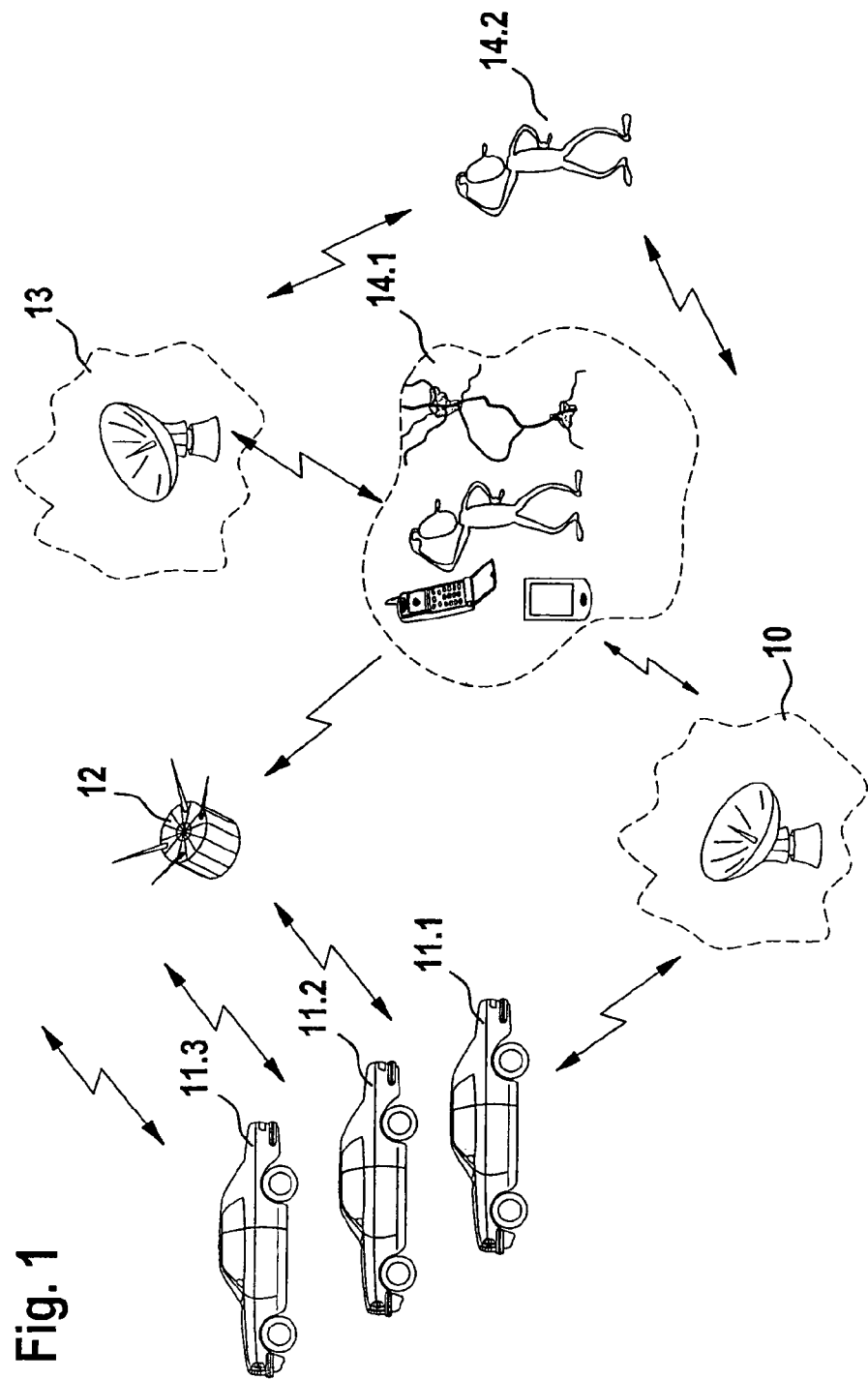
FIG. 1 schematically shows a system for procuring services.

The core of the present invention is to create a system that makes it possible to offer a service such as a rideshare opportunity almost in real time, and to attempt to utilize the available transportation resources even better than before, to lower the costs and thus to enhance mobility without placing additional load on the traffic systems. The present invention is based on the recognition that unutilized transport capacities exist day in day out only because it has not been previously possible to bring supply and demand together in a sufficiently timely manner. This is true in particular for short-term transportation supply and transportation demand which are impossible to schedule longer term. The prerequisite for the inventive approach is the possibility to detect position information of suppliers and interested parties in real time to the extent possible and to store this information, together with other information transmitted by them, at least temporarily to make a timely comparison between supply and demand and identify the offerings that satisfy the demand. The present invention makes use of the fact that many potential users of such a system, i.e., both suppliers and interested parties, are already equipped with GSM/GPRS/UMTS and/or GPS units. It is to be assumed that these devices will be even more widely used in the foreseeable future. For example, if vehicles available for rideshare are equipped with such devices, their current position may be easily determined and transmitted to the server. Furthermore, in particular in population centers, the position of an interested party may be determined with sufficient accuracy using different positioning methods if the interested party is using a mobile terminal such as, for example, a PDA, a cell phone, etc. FIG. 1 shows a schematic representation of the structure of the system according to the present invention. System 1 includes at least one server 10, which is preferably stationary. Two suppliers 11.1 and 11.2 represent an arbitrary number of suppliers. These suppliers 11.1 and 11.2 are mobile subscribers or users of system 1, for example, the drivers of vehicles equipped with a navigation system, which offer a rideshare opportunity from point x to point y. Reference number 12 identifies a satellite of the GPS system. Reference number 13 identifies an infrastructure device of a network operator, for example, a transceiver device. Reference numbers 14.1 and 14.2 identify two interested parties equipped with a mobile terminal such as a PDA or a cell phone, who represent an arbitrary number of interested parties. Like suppliers 11.1, 11.2, interested parties 14.1, 14.2 are mobile subscribers or users of system 1, who for example are looking for a rideshare opportunity from point x to point y. The above-named system components, i.e., users of the system, are connected via a data link which makes various types of information exchange possible. FIG. 1 schematically shows this data link using arrows and double arrows. This data link is advantageously implemented using existing telecommunication networks which preferably allow wireless communication between the above-mentioned system components and users.

The users of the system, both suppliers 11.1, 11.2 and interested parties 14.1, 14.2, preferably register with server 10 and save a user profile to be defined by the system administrator, which takes into account the interests of both suppliers 11.1, 11.2 and interested parties 14.1, 14.2. This user profile may include, for example, information about the available or desired vehicles, in addition to personal data, cost information and a photo. The users may determine which information is intended for the service provider only and which information may also be forwarded to other users. Such a registration may be performed by potential users of system 1 even in advance, i.e., independently of a specific service procurement operation, so that the appropriate data is already available to server 10 when an offer for a rideshare opportunity or a corresponding inquiry are communicated to server 10 later. This procedure is recommended in particular for regular users of system 1. For the present example, it is assumed that both supplier 11.1 and interested party 14.1 are regular users of system 1 and have registered the following user profiles with server 10:

Supplier 11.1:
Person: male, age 52, frequent driver, non-smoker, passport photo
Vehicle: DC E-Class, almost-new condition
Cost of ride: 5 cents/km
Passenger accident insurance
Interested party 14.1:
Person: male, age 32, no driver's license, non-smoker, passport photo
Supplier 11.2 and interested party 14.2, not previously known to server 10, have a current offer and inquiry, respectively, and supply the parameters of their offer and inquiry to server 10.
Supplier 11.2:
Person: male, age 32, frequent driver, smoker, passport photo
Vehicle: DC C-Class, passenger accident insurance, looking for riders who are prepared to take the wheel for part of the trip.
Interested party 14.2:
Person: male, age 23, driver's license for passenger and utility vehicles, smoker, passport photo

EXAMPLES

Example 1

Figures 2, 3:
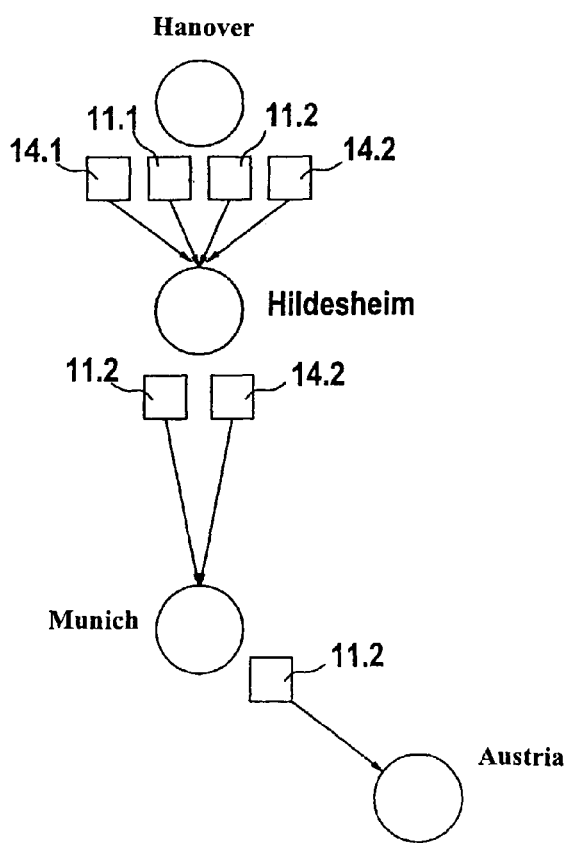
FIG. 2 shows a list of offerings.
FIG. 3 shows a route plan.

A first exemplary embodiment is elucidated with reference to FIGS. 2 and 3. FIG. 2 shows a list of offerings and FIG. 3 shows a route plan.

On Monday morning, suppliers 11.1 and 11.2 are on their way from Hanover to Hildesheim. Supplier 11.1 wishes to reach his workplace in Hildesheim. Supplier 11.2 has initiated a long drive to Austria and plans to stop in Hildesheim to pick up some packages. When initiating the trip, suppliers 11.1 and 11.2 communicated their planned routes, including time information such as start time, possible time of arrival at the destination and intermediate times, to server 10. They also entered their rideshare offers. Supplier 11.1, for example, is able to accept three more passengers. Supplier 11.2 is willing to transport a passenger who has a driver's license and is willing to drive the vehicle on portions of the planned long route to take some of the strain off supplier 11.2. At the same time, an interested party 14.1 is looking for a rideshare opportunity for two people from Hanover, Hildesheimer Strasse 23 to Hildesheim, Goslarer Strasse 12. He sent this rideshare inquiry to server 10. A list of offerings, starting with supplier 11.1, is transmitted in response. In addition or alternatively to this list, a location plan having travel segments marked may be transmitted, from which the current positions of the suppliers of the current rideshare opportunities who are currently traveling on that stretch or will be traveling on portions of the desired route and are willing to take on passengers are visible. In addition, background information on the suppliers and their vehicles is transmitted. This includes, for example, price information, i.e., whether the supplier offers a rideshare opportunity at no cost or for a fee. In addition, background information on the vehicles and individuals in question is available, because suppliers and interested parties must log in or register prior to the planned use of the service. Possible information may include vehicle type, name of supplier or driver, photo of vehicle and supplier, and the like. When interested party 14.1 clicks on the selected vehicle symbol or the item in the list (here supplier 11.2), supplier 11.2 receives a message that, for example, an interested party 14.1 would like to have a ride from Hanover to Hildesheim. Furthermore, additional information on interested party 14.1, such as for example a photo, may be transmitted to supplier 11.1. Supplier 11.1 may then respond to the rideshare request of interested party 14.1 by pressing a button and/or via voice input. Advantageously destination information is derived therefrom at the same time, which is supplied to the navigation system of the vehicle of supplier 11.1 and is stored therein as a future stop. In the present example, interested party 14.1 has selected supplier 11.1, who promptly also acknowledges the inquiry of interested party 14.1. Supplier 11.1 then drives to the current position of interested party 14.1 to pick up the passenger. Since interested party 14.1 has transmitted his inquiry via a mobile terminal, it is comparatively easy for server 10 to determine his current position automatically in cooperation with the devices of the network operator. The mobile terminal is also able to determine the position itself using a positioning module. The data is preferably transmitted via existing data networks, such as in particular GSM, GPRS or other suitable data links. GPRS could be conveniently used for transmitting position data of the mobile partner (supplier, interested party) to and from the server, because this allows a permanent online link to be implemented, and the quantity of data to be transmitted is very low.

Interested party 14.2 is looking for a rideshare opportunity from Hanover to Munich. Server 10 provides him with a list of offerings, which includes the offer of supplier 11.2. He accepts this offer, because it promises him a free rideshare in exchange for occasionally driving the vehicle.

Example 2

Figure 4:
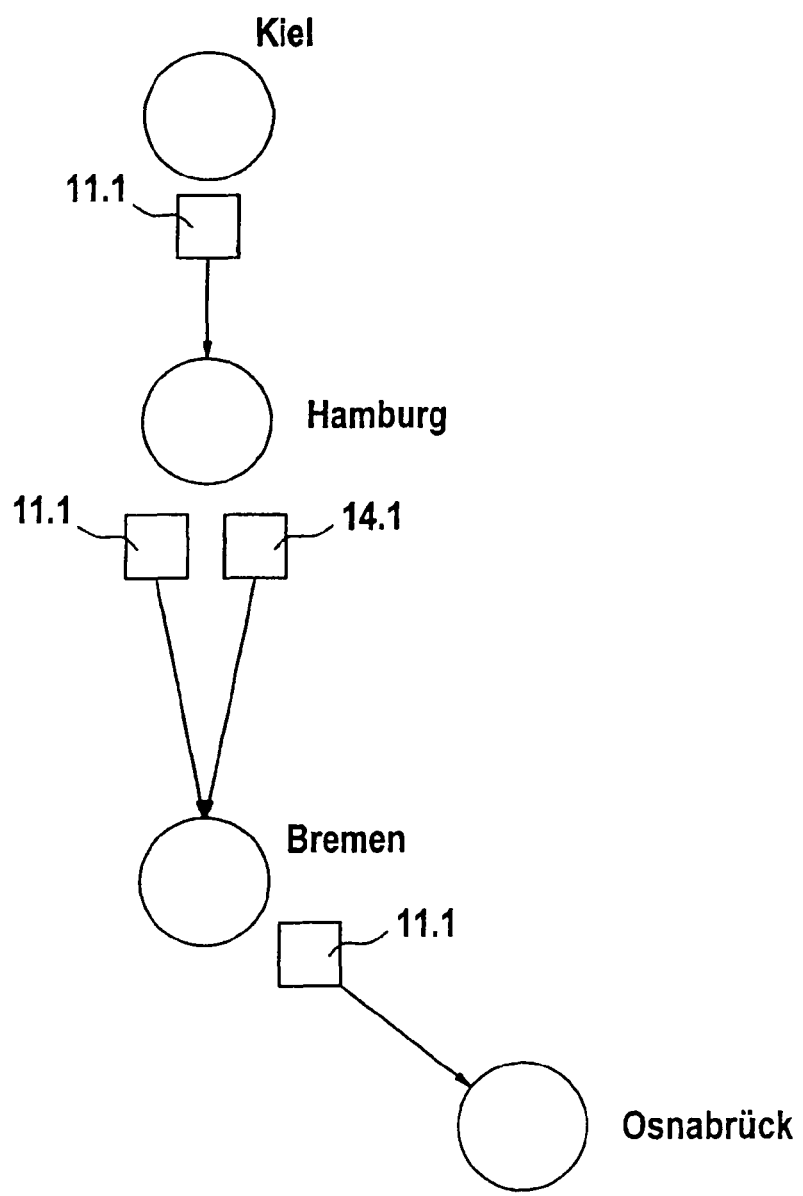
FIG. 4 shows a route plan.

A second example is elucidated with reference to FIG. 4. A supplier 11.1 wishes to drive from Kiel to Osnabrück and is willing to take on a passenger. His route leads him via Hamburg and Bremen. An interested party 14.1 would like to travel from Hamburg to Bremen. Those routes thus coincide on the stretch from Hamburg to Bremen. Interested party 14.1 may use this rideshare opportunity for traveling from Hamburg to Bremen.

Example 3

Figure 5:
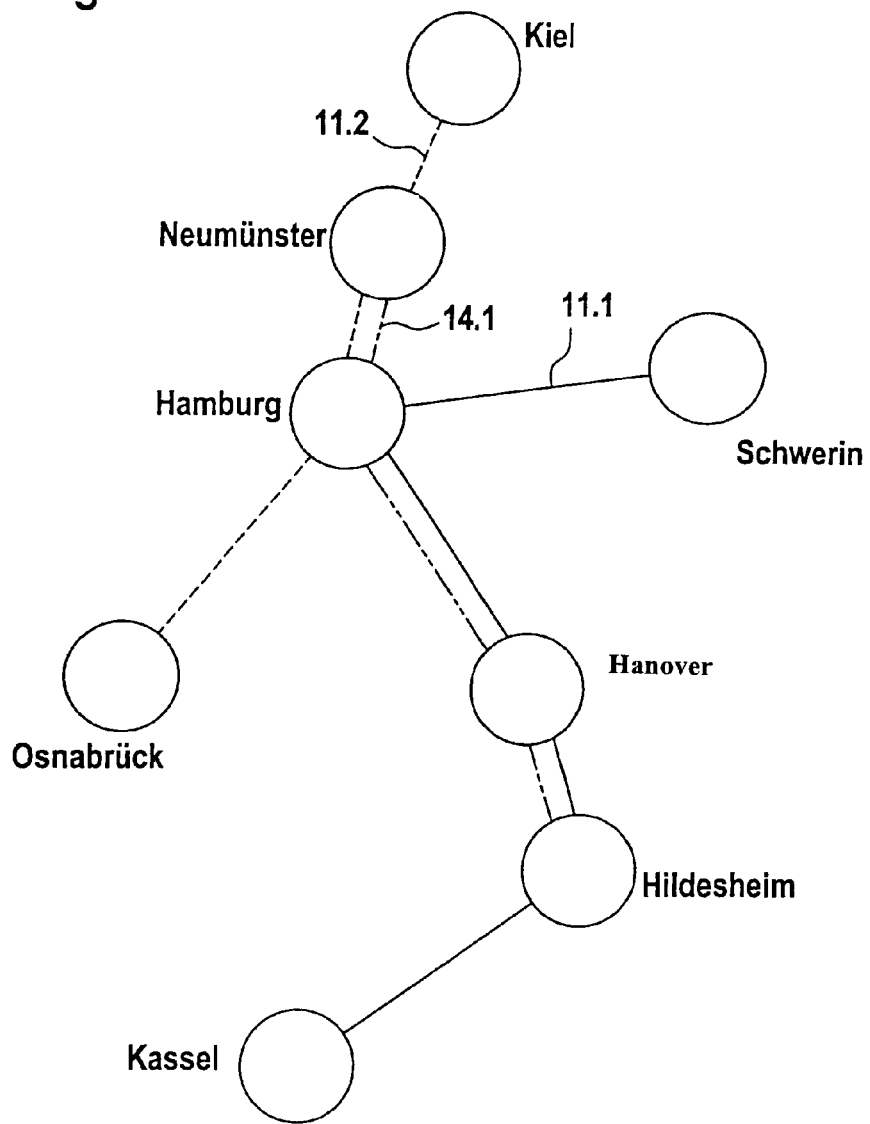
FIG. 5 shows a route plan.

A third example is elucidated with reference to FIG. 5. A first supplier 11.1 is driving from Schwerin to Kassel via Hamburg and is willing to take on a passenger. A second supplier 11.2 is driving from Kiel to Osnabrück and is also willing to take on a passenger. An interested party 14.1 would like to travel from Neumünster to Hildesheim and would thus be able to ride with second supplier 11.2 between Neumünster and Hamburg. He then gets out at a rest stop in Hamburg and inquires, via cell phone, about a rideshare opportunity from Hamburg to Hildesheim. Supplier 11.2 continues his trip to his destination of Osnabrück. In the meantime, supplier 11.1 is about to arrive in Hamburg. The server is aware of the route and the current position of first supplier 11.1 and communicates this to interested party 14.1. Interested party 14.1 now sends an inquiry to first supplier 11.1, who agrees to the ride request. Therefore, he picks up interested party 14.1 at the rest stop and transports him from Hamburg to Hildesheim. There he drops off interested party 14.1 at his destination and continues his drive to Kassel.

In another example, an interested party 14.1 would like to travel from Hanover, Hildesheimer Strasse 123 to Hildesheim, Goslarer Strasse 12. His inquiry is transmitted to server 10. As a response, interested party 14.1 receives a list containing vehicles and route segments showing the positions of suppliers 11.1, 11.2, 11.3, who are traveling on the desired segments or at least portions thereof and would like to take on a passenger. Background information, which is stored on server 10, is available on these suppliers. Possible information includes vehicle type, information on the driver and/or vehicle owner, picture of driver and/or vehicle, price charges, etc. When interested party 14.1 clicks on the selected vehicle symbol or the item in the list on his terminal, the driver of the selected vehicle receives a message that a rideshare between point x and point y has been requested. Furthermore, possibly at the request of supplier 11.3, additional information on interested party 14.1 such as, for example, personal data and/or a photo may be transmitted. Supplier 11.3 may then acknowledge the rideshare request by pressing a button or via voice input and thus accept the rideshare. Together with this acknowledgment, the meeting point agreed upon may be entered in the vehicle's navigation system as the destination. The data to be exchanged may be transmitted via GSM, GPRS or other data links. GPRS may also be used for transmitting position data, because this allows a permanent online link to be implemented, and the quantity of data is very low.

Of course, the procurement procedures may also take place in the opposite direction. Thus, for example, a supplier may be currently looking for a suitable interested party for his offer of a rideshare or another transportation service.

In another example, the system may be used for tracking the current position of a package service or a packaged goods delivery service. In combination with a route planner, the receiver of a package may be automatically notified when the package service arrives in the proximity of the delivery address. An estimated time of arrival may also be transmitted. Dispatchers and their clients may communicate their transportation services and orders, as well as, if necessary, their usual route network, to server 10 and let the server optimize the transportation services. Unnecessary empty runs of trucks may thus be avoided.

The system may be further extended by involving further suppliers of transportation services such as airlines, railroads, and shipping companies. Mobility may thus be further enhanced and costs may be reduced.

In a further example, trips or at least trips on partial stretches using public means of transportation may be suggested as an alternative. For this purpose, the current vehicle positions of such means of transportation, as well as arrival and departure times, may be communicated, which allows the time of arrival at a stop to be estimated to thus avoid unnecessary waiting times. Price information may also be communicated. This alternative may be used in particular if no rideshare offerings using private vehicles are available at certain times and/or on certain stretches.

With the aid of the system, transportation services over an entire region may also be implemented by having one vehicle or multiple vehicles available for servicing an area or a corridor. These vehicles are not assigned to any predefined routes or fixed stops. Instead, suitable routes are prepared by server 10 on demand in real time. Any rideshare request is communicated to the nearest available vehicle, which then heads to the pickup point.

The system may also be advantageously used by taxi companies, which make use of the services of server 10. The current position of free taxis may thus be determined to keep the cost of driving to the customer as low as possible. For communal taxis an optimum route may be determined, which ensures the highest possible utilization of the seating capacity. This improves the taxi company's revenue situation, while at the same time reducing the costs for the passenger.

All the procurement procedures performed by the system are advantageously logged for reproducibility. This is also recommended if costs are to be recovered for system activities, for example, by charging fees for successful mediation operations.

What is claimed is:

1. A computer-implemented method for procuring a service, comprising:
exchanging, using a processor, information between the at least one stationary physical server and the plurality of devices accessible to subscribers including at least one device accessible to suppliers and at least one device accessible to interested parties;
determining, using the processor, a current position of the devices accessible to subscribers;
storing, using the processor, data corresponding to position and route information of the subscribers;
comparing, using the processor, transportation requests, communicated to the at least one server from at least one device accessible to interested parties, to transportation offerings, communicated to the at least one server from at least one device accessible to suppliers; and
determining, using the processor, whether any transportation requests match any transportation offerings, and, in the case of a match, communicating the match to the device accessible to interested parties that communicated the matching request, the transportation offerings including a starting point, a destination point, and intermediate route information, and at least one of the transportation offerings includes at least one of a starting region and a destination region, the at least one of a starting region and a destination region being defined by a radius value around a respective geographic coordinate to increase a probability of a match.

2. The method as recited in claim 1, further comprising:
establishing, using the processor, a communication link between the device accessible to suppliers that communicated the matching offering and the device accessible to interested parties that communicated the matching request if there is a match.

3. The method as recited in claim 1, wherein the current position of the devices accessible to subscribers is determined in real time.

4. The method as recited in claim 1, wherein transportation offerings communicated from multiple devices accessible to suppliers are combined to offer an interested party an uninterrupted route.

5. The method as recited in claim 1, further comprising:
determining, using the processor, projected arrival times for positions of a route; and
communicating, using the processor, the projected arrival times to at least one device accessible to subscribers.

6. The method as recited in claim 1, wherein the transportation offerings are provided in the form of one of a list and a map display containing time information.

7. The method as recited in claim 1, further comprising:
notifying, using the processor, at least one device accessible to a subscriber if a supplier has reached a certain position.

8. The method as recited in claim 1, wherein a transportation request includes at least one of a starting point and a destination point, and defines at least one of a starting region and a destination region by including a radius value around at least one of the starting point and the destination point to increase a probability of a match.

9. The method as recited in claim 1, wherein a transportation offering defines a corridor having a predefinable width along a travel route to increase a probability of a match.

10. The method as recited in claim 1, wherein the transportation offerings and transportation requests, when defining departure times and arrival times, define time windows to increase a probability of a match.

11. The method as recited in claim 1, further comprising:
offering, using the processor, a transportation option using a public means of transportation to at least one device accessible to interested parties.

12. The method as recited in claim 1, further comprising:
offering, using the processor, a selection list including alternate transportation offerings to at least one device accessible to interested parties.

13. The method as recited in claim 1, further comprising:
storing, using the processor, parameters identifying the suppliers and the interested parties.

14. The method as recited in claim 1, wherein the service includes one of a rideshare opportunity and a transportation service.

15. The method as recited in claim 1, wherein a transportation request defines a corridor having a predefinable width along a travel route to increase a probability of a match.

16. The method as recited in claim 1, wherein the intermediate route information is taken into account in procuring a service.

17. The method as recited in claim 1, wherein a transportation request defines a corridor having a predefinable width along a travel route to increase a probability of a match, and wherein the intermediate route information is taken into account in procuring a service.

* * * * *